(12) United States Patent
Neufeglise (10) Patent No.: US 7,106,185 B1
(45) Date of Patent: Sep. 12, 2006

(54) INTERIOR LIGHT BAR (75) Inventor: Steven W. Neufeglise, Rochester, NY (US)

(73) Assignee: Star Headlight and Lantern Co., Inc., Avon, NY (US)

( * ) Notice: Subject to any disclaimer, the term of this patent is extended or adjusted under 35 U.S.C. 154(b) by 63 days.

(21) Appl. No.: 10/423,102

(22) Filed: Apr. 25, 2003

Related U.S. Application Data (60) Provisional application No. 60/375,385, filed on Apr. 25, 2002.

(51) Int. Cl.
*B60Q 1/26* (2006.01)

(52) U.S. Cl. .............. 340/468; 340/472; 340/473; 362/37; 362/41; 362/490; 362/503; 362/504; 362/523; 362/531

(58) Field of Classification Search ............ 340/468, 340/472–479; 362/490–495, 503–505, 523, 362/549, 37–40, 371, 368
See application file for complete search history.

(56) References Cited

U.S. PATENT DOCUMENTS

| | | | | |
|---|---|---|---|---|
| 3,665,392 A | * | 5/1972 | Annas | 340/479 |
| 4,180,010 A | * | 12/1979 | McDermott et al. | 362/526 |
| 4,222,092 A | * | 9/1980 | Bray | 362/487 |
| 4,449,167 A | * | 5/1984 | Cohen | 362/269 |
| 4,651,129 A | * | 3/1987 | Wood et al. | 340/479 |
| 4,981,363 A | * | 1/1991 | Lipman | 362/503 |
| 5,884,997 A | * | 3/1999 | Stanuch et al. | 362/493 |
| 6,522,216 B1 | * | 2/2003 | Makino et al. | 333/24.2 |
| 2004/0075537 A1 | * | 4/2004 | Quigley et al. | 340/425.5 |

* cited by examiner

*Primary Examiner*—Daniel Wu
*Assistant Examiner*—Son Tang
(74) *Attorney, Agent, or Firm*—Kenneth J. Lukacher; Martin Lukacher

(57) ABSTRACT

A full function light bar is provided mountable inside a vehicle against the windshield. The light bar is an assembly of several light sources, including strobe lamps, flashing lamps, oscillating lamps, and an aimable take down lamp. The light bar is not limited in application to one specific vehicular model and is adaptable and adjustable to conform to the windshield, rear window, or other interior cab surfaces of varying shape (curvature). The light sources are supported on a flexible support mount which has adjustable, flexible gaskets. End caps and the gaskets screen the inside of the vehicle from the light emitted by the light bar. The support mount is hung on adjustable brackets which allow the light bar to be raised, lowered and tilted to further facilitate conformance with the windshield.

2 Claims, 14 Drawing Sheets

INTERIOR LIGHT BAR

This application claims priority to Provisional Patent Application No. 60/375,385, filed Apr. 25, 2002, which is incorporated herein by reference.

DESCRIPTION

The present invention relates to warning light assemblies known as light bars, which contain one or more light sources, and particularly to a light bar which is designed for mounting and use inside a vehicle, rather than on the roof of a vehicle as heretofore has been the case for full function light bars.

By a full function light bar is meant, a light bar which employs different types of light sources, such as pulsed light sources, usually strobe lamps, high intensity lamps and rotating or oscillating lamps. It is a feature of the present invention to provide an improved take down lamp light source which is adapted to project a beam in various directions by tilting and moving the light source so it is directed at a perpetrator and facilitating the police to take down that person. The take down lamp may be on the light bar. While a light bar may be straight, the term light bar includes curved or multi-part assemblies which provide warning and police related illumination. The term inside may be taken broadly as disposition on the inside of the windshield or other window or interior surface of the cab or passenger compartment, whether the light bar is mounted by suspension from an interior fixture or attached to the framing for the windshield as in a "Jeep" type vehicle.

Typical light bars are mounted outside the vehicle, usually on the roof thereof. A more complex light bar of the exterior mounted type is shown in Lyons, U.S. Pat. No. 5,826,965, issued Oct. 27, 1998. Such exterior light bars make the special purpose of the vehicle apparent. Sometimes it is desirable to use unmarked cars for police purposes. This capability is not afforded when an exterior light bar is used. There are also problems of noise generation when the vehicle is in motion, corrosion, and the cost of installation on the vehicle, in case of exterior light bars. Also, exterior light bars having light sources which can be aimed, require remote control mechanisms which are difficult and expensive to implement. See Lipman, U.S. Pat. No. 4,981,363, issued Jan. 1, 1991. Take down lights are needed to light up the area in front of a police car. Often times these take down lights are used as a safety feature for the officers. These lights allow illumination of a vehicle or suspect in front of the police car, while at the same time reducing the view that the suspect has of the officer.

It is a feature of the invention to provide take down lights adjustable from within the vehicle, since the take down light may be a light source of a light bar providing the take down illumination function. The interior take down lights of a light bar provided in accordance with the invention allows the officer to direct the beam towards the intended target rapidly and without leaving the vehicle, thus increasing the effectiveness of the take down light. Since the light is within the vehicle, the take down function may be accomplished with vehicles of varying size and accommodates varying roadway surroundings (e.g., hills, curves, or road shoulders), so as to enhance the effectiveness of take down lights.

Another feature of the invention is to provide an interior light bar that may be located in proximity to the inside surface of the windshield of the vehicle. The light bar assembly provided by the invention is adapted to be installed inside the vehicle in a manner that light is directed principally, perpendicular to the windshield. This provides the optical advantage of reducing reflections. The intensity of the light which is projected through the windshield, then, is not diminished due to wasted reflected light.

A principal problem solved by the invention is to provide an interior or inside light bar which is constructed and supported to conform to windshields and other interior surfaces having various shapes and curvatures. Accordingly, the interior light bar provided by the invention is not limited to a windshield of particular curvature and is useful on many styles and models of vehicles.

Figure 13:
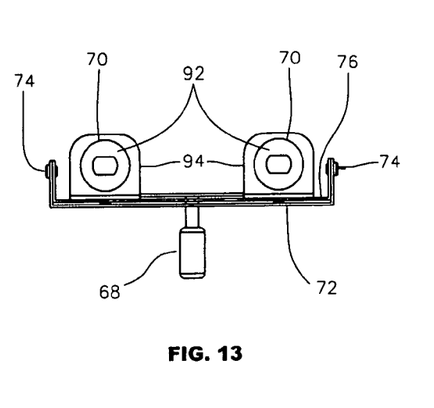
FIG. 13 is a front view of the take down light shown in FIG. 12.
Figure 14:
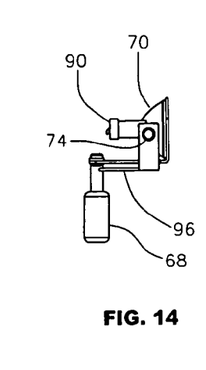
FIG. 14 is a side view of the take down light shown in FIGS. 12 and 13.

Interior light sources have been suggested which are adapted to be mounted on the dashboard or clipped to the outside of the visor. Such light sources are alluded to in Gavagan, U.S. Pat. No. 4,788,630, issued Nov. 29, 1988; Lyons, U.S. Pat. No. 5,660,457, issued Aug. 26, 1997; and Pokorney, U.S. Pat. No. 5,988,839, issued Nov. 23, 1999. These windshield and dash mounted warning lights are not in assemblies which provide full function light bars, such full function light bars being suitable only for external mounting. It has been proposed to mount light sources inside a vehicle to project light through the windshield; however, these are not adapted to provide for effective and secure attachment and conformance to windshield surfaces of various curvature when in close proximity thereto. See Nock, U.S. Pat. No. 1,674,340, Issued Jun. 19, 1928; Gillespie, U.S. Pat. No. 2,017,798, issued Oct. 15, 1935; Annas, U.S. Pat. No. 3,665,392, Issued May 23, 1972; Serizawa, U.S. Pat. No. 4,733,335, Issued Mar. 22, 1988; Machida, U.S. Pat. No. 5,050,051, Issued Sep. 17, 1991; Strickland, U.S. Pat. No. 6,511,216, Issued Jan. 28, 2003; and Pederson, U.S. Pat. No. 6,461,088, Issued Oct. 8, 2002, (FIGS. 13 and 14). In addition, there are no facilities with such dash and visor mounted devices for mounting adjacent to the windshield and reducing reflections from the windshield. Unlike light bars provided by the invention, such dash and visor mounted vehicles undesirably illuminate the inside of the vehicle and can produce background illumination, which can interfere with driving and with police functions.

Accordingly, it is a principal of the present invention to provide an improved light bar which is capable of mounting within a vehicle, especially on the inside thereof, in proximity to the windshield and accommodates a wide range of windshield shapes and curvatures.

It is another objection of the present invention to provide an improved full function interior mounted or internal light bar.

It is a still further object of the invention to provide an improved take down light source, which is particularly adapted for mounting on, and as part of, an inside or internal light bar for a vehicle.

Briefly described, a light bar in accordance with the invention is installable internally of a vehicle. The light bar has at least one light source and preferably has a plurality of light sources providing full light bar functions, such as flashing and pulsing lights, rotating lights, and can also have take down functionality. The light bar is installed with the light source thereof facing and preferably in proximity to the windshield. The light bar has a mounting including a flexible housing, preferably with gaskets or boots adjustable with respect to the mounting. The adjustable and flexible housing and its boots enable the light bar to be installed engaging the inside of the windshield and in conformance therewith. The housing is suspended on a member which is positionable to displace and tilt the housing thereby facilitating mounting in conformance with the windshield. Because of its flexibility and adjustability, the light bar can adapt and conform to the curvature shape of windshields of various and different curvature so as not to be limited in use to a particular type or model of vehicle.

The foregoing and other objects, features and advantages of the invention will become apparent from a reading of the following description in connection with the accompanying drawings in which.

Figures 1, 1A:
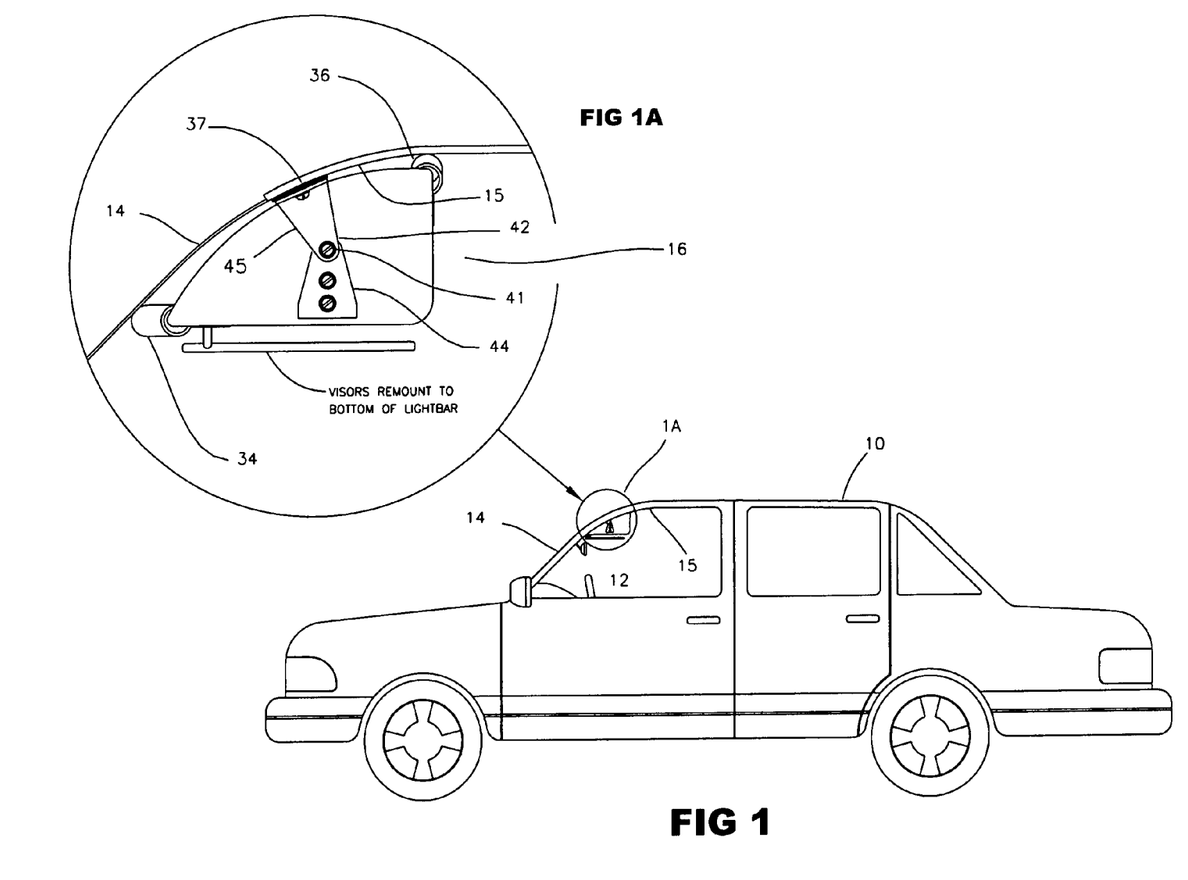
FIG. 1 is a side elevation of a vehicle having a light bar in accordance with the invention, installed therein.
FIG. 1A is an enlarged view of the light bar assembled in the vehicle and is taken within the line designated 1A in FIG. 1 and along the line 1A—1A in FIG. 2 in the direction of the arrows.
Figure 2:
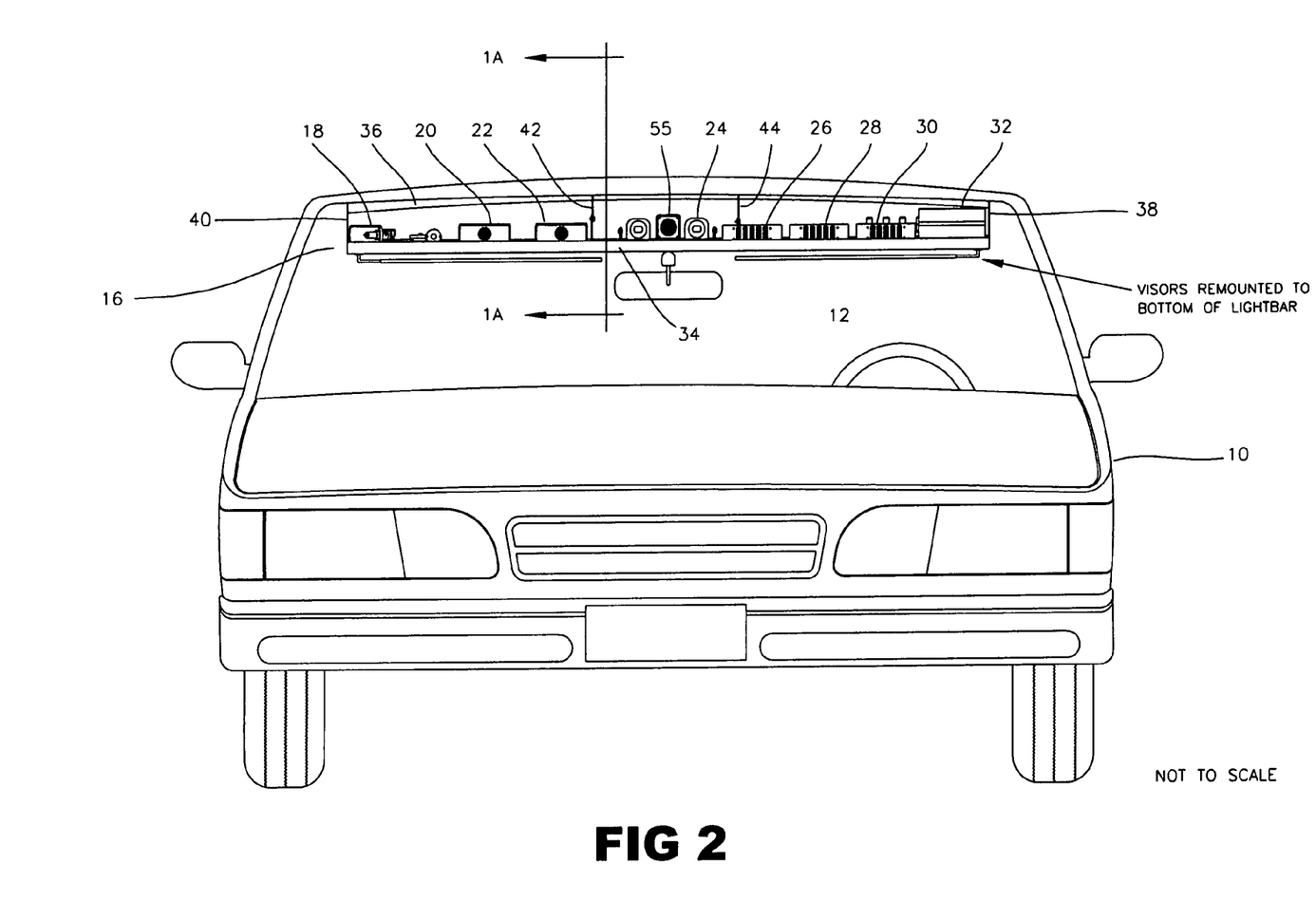
FIG. 2 is a front view of the vehicle of FIGS. 1 and 1A.
Figure 3:
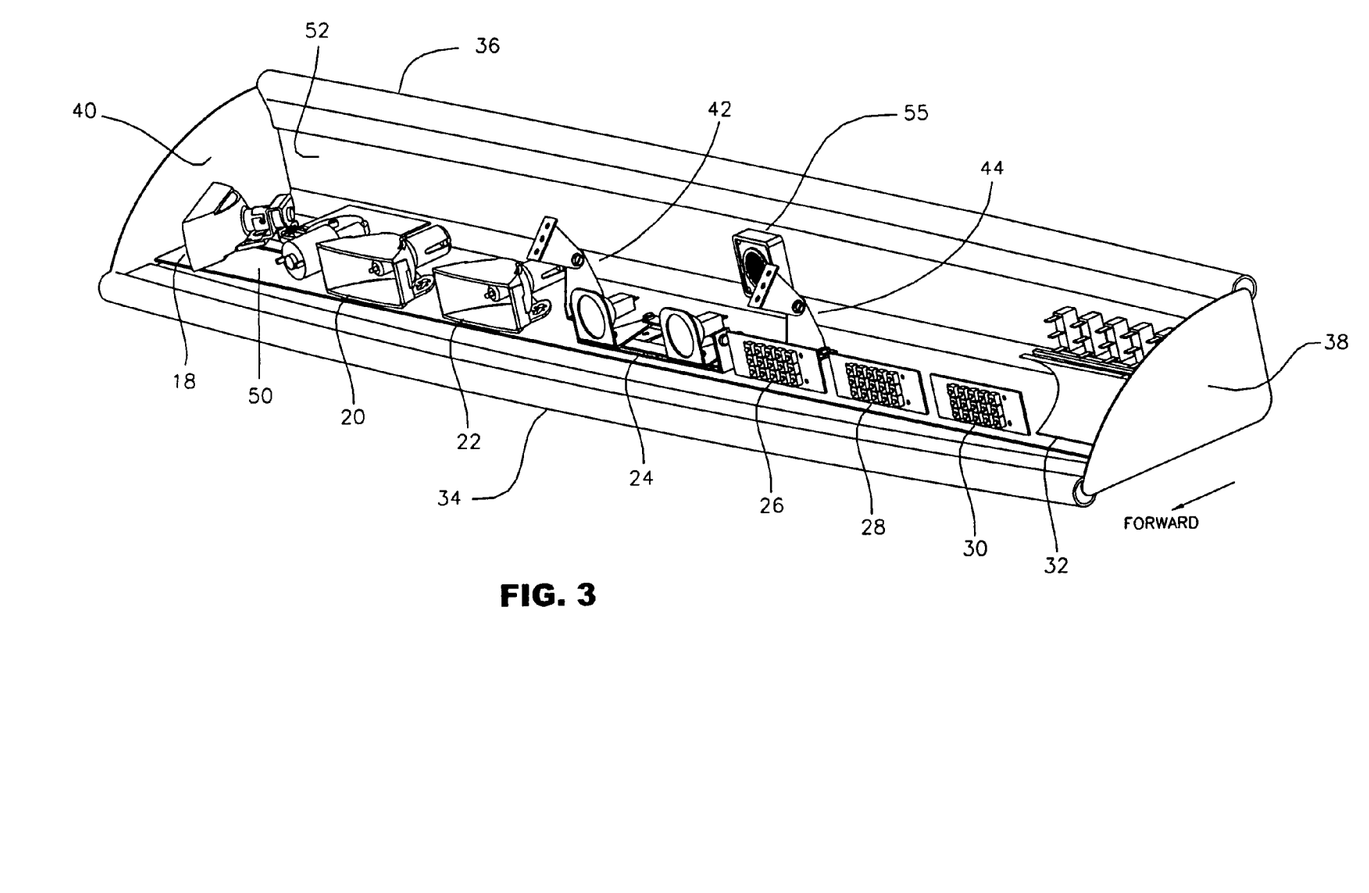
FIG. 3 is a perspective view of the light bar shown in FIGS. 1 and 2.

Referring to the drawings, particularly to FIGS. 1, 1A and 2, there is shown a vehicle 10, such as a police car, having a cab or interior 12 with a windshield 14 and a ceiling or headliner 15. Attached to the ceiling 15 and mounted adjacent and in proximity to the windshield 14 is a flexible light bar 16 provided by the invention. The light bar 16 has a plurality of light sources 18 to 32 which are shown in and will be described in connection with FIGS. 3–6. The light bar has a flexible housing 33 from which boots or gaskets 34 and 36 extend into engagement with the windshield 14 and ceiling 15, and space the light sources 18–32 in proximity to the windshield 14 irrespective of the curvature of the windshield 14, thereby adapting the light bar 16 to be installed in vehicles 10 having windshield 14 and headliners 15 or windshield frames of various and different curvatures. The ends of the light bar 16 have end caps or screens 38 and 40. The housing 33 (called herein the extrusion as it may represent a plastic extrusion), its gaskets 34 and 36 and the end caps 38 and 40 maintain the light bar 16 undercover and limit the light which is emitted into the vehicle 10. Notwithstanding that the light bar 16 is inside the vehicle 10 and provides intense illumination, it does not release illumination significantly interfering with (blinding) the driver's view and adversely affecting the driver's operation of the vehicle 10.

Figure 9:
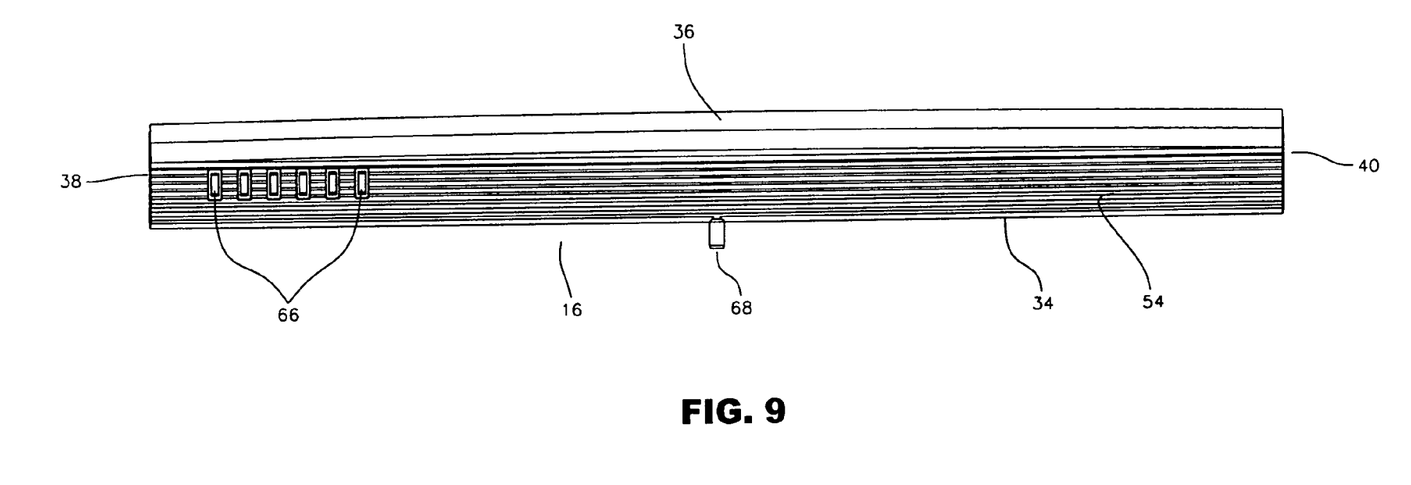
FIG. 9 is a rear view of the light bar, as viewed from the driver's position.
Figure 9A:
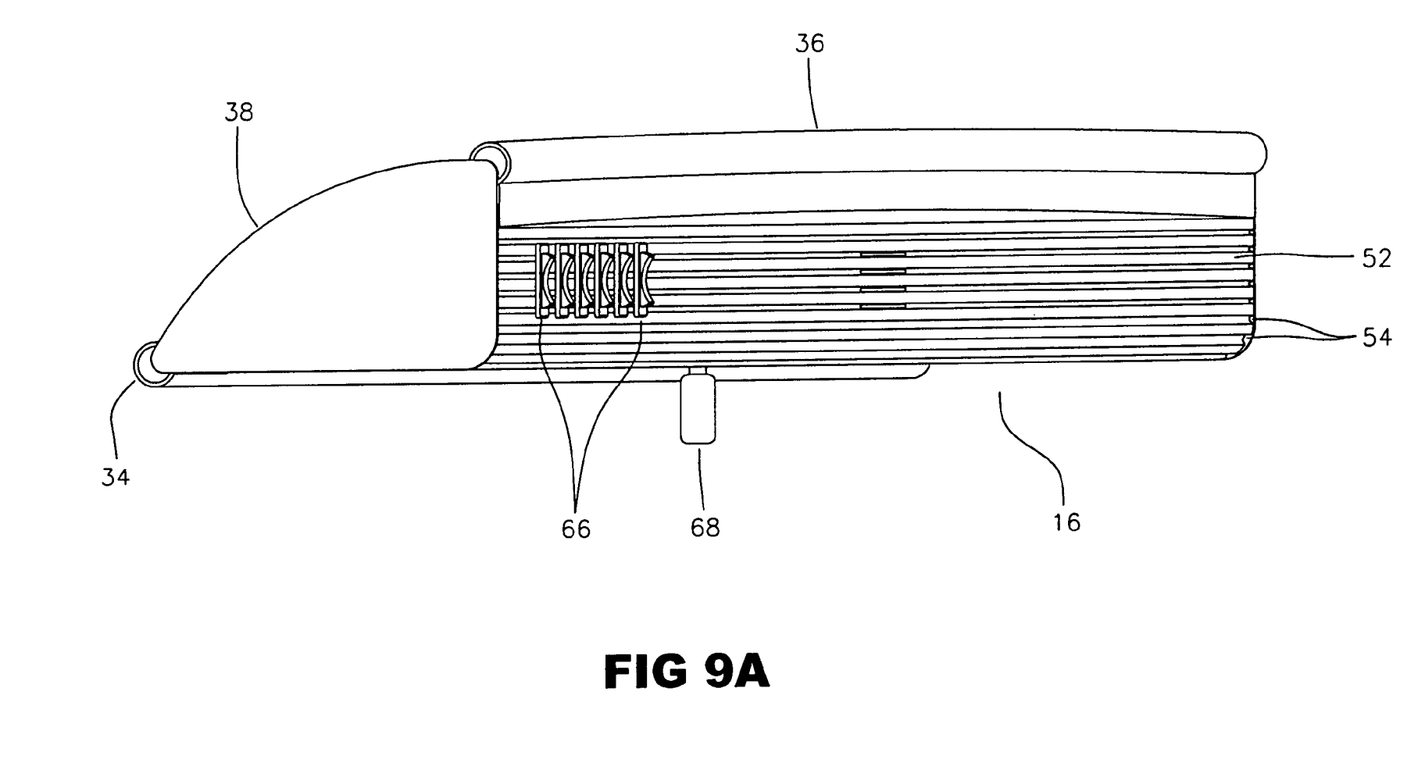
FIG. 9A is a perspective view of the light bar taken from the rear.
Figure 9B:
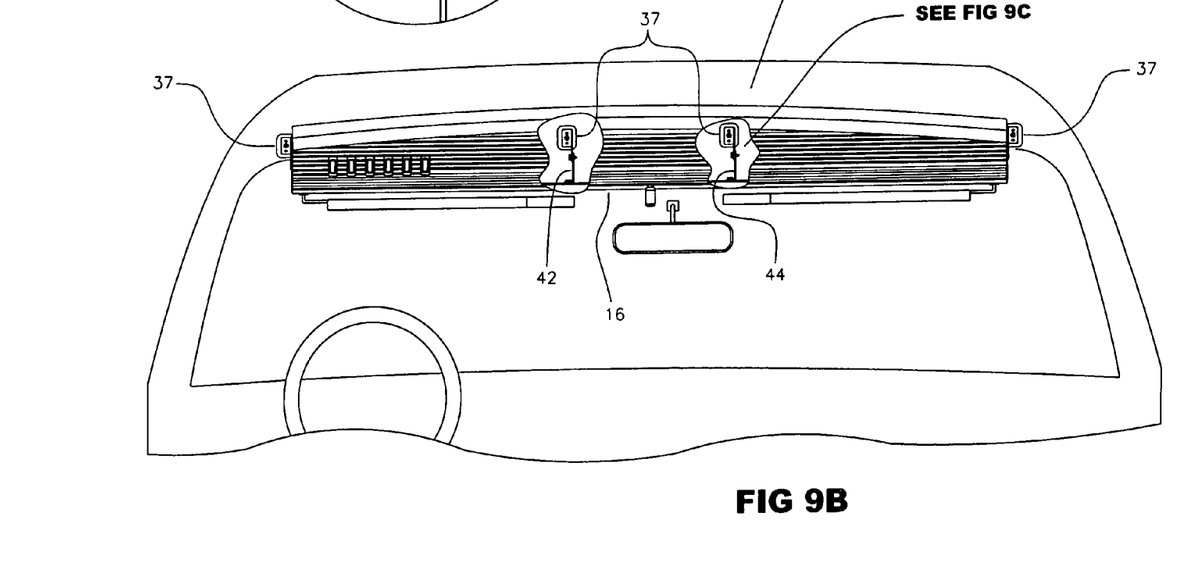
FIG. 9B is a perspective view of the light bar mounted inside the windshield and taken from the rear thereof, i.e., from the inside of the cab, the view being broken away to show the mounting brackets which suspend the light bar.
Figure 9C:
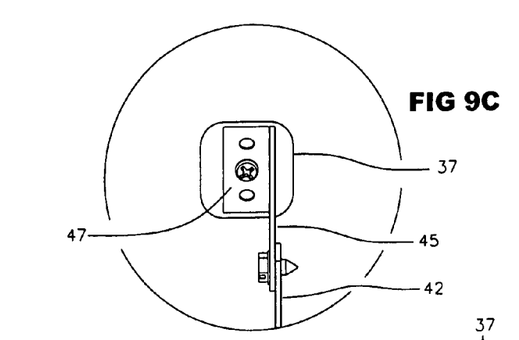
FIG. 9C shows the mounting in greater detail.
Figure 10:
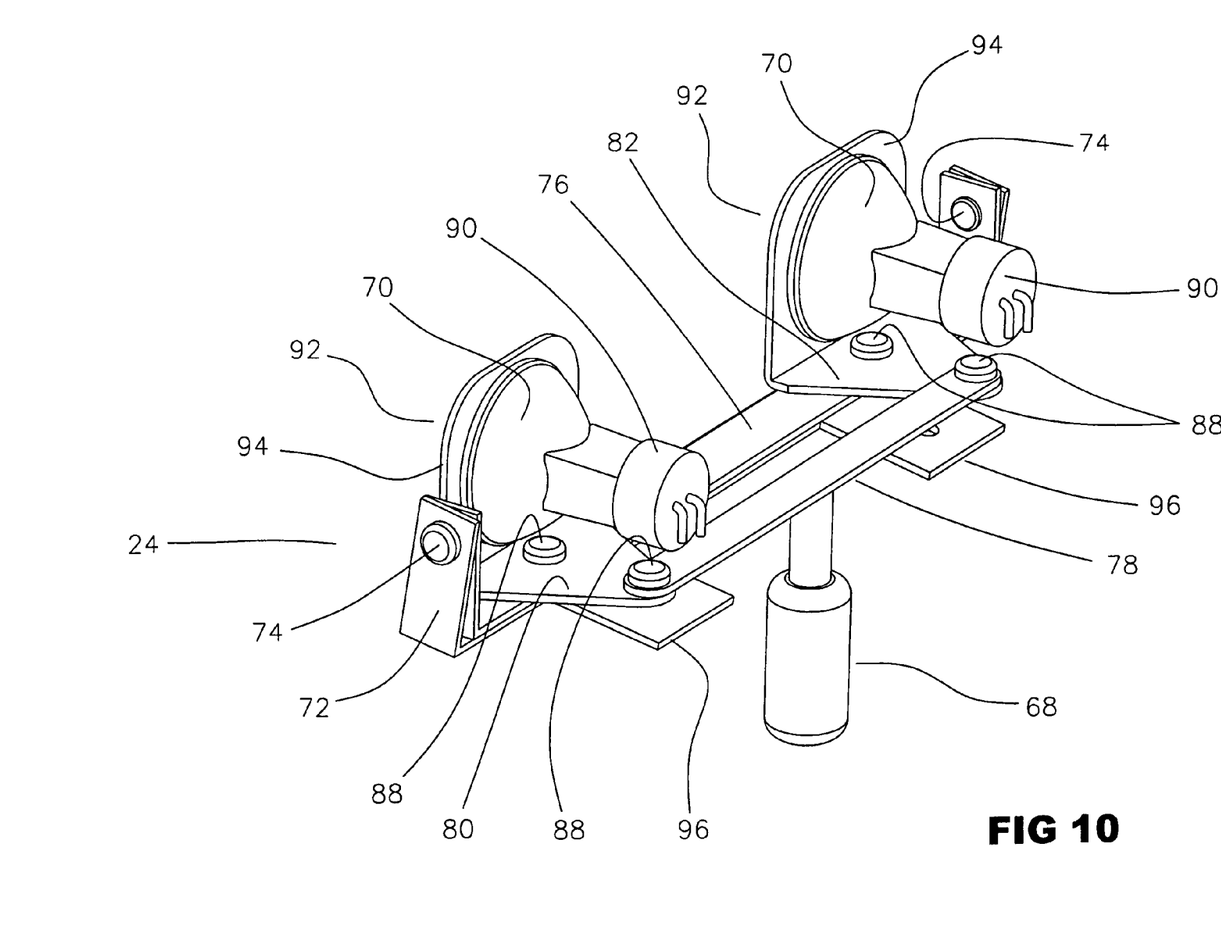
FIG. 10 is perspective view of the take down light assembly which may be installed in the light bar shown in the previous figures.
Figure 11:
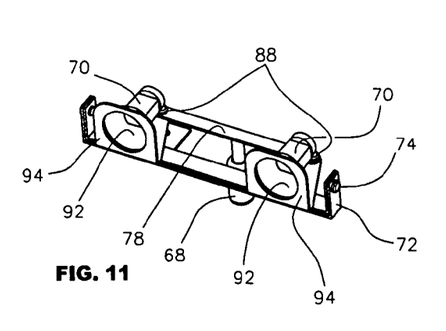
FIG. 11 is a perspective view of the take down light taken from the front.

The light bar 16 may be mounted to any hard points of the ceiling 15, such as visor arm mounts 37 have been connected (see FIGS. 1A, 9B and 9C). Brackets 42 and 44 which have two pivotally connected parts, one is connected to the light bar 16 and the other to the ceiling 15 at the visor arm mounting 37, may be used to hang the light bar 16 to the ceiling 15.

Referring to FIGS. 3–9, the interior or "undercover" light bar 16 has light sources 18–32 providing a compliment of sources available in full function light bars 16 which are adapted solely for exterior mounting. Thus, the interior or "undercover" has the equivalent or greater functionality than of the conventional exterior variety of light bar 16. The various light sources 18–32 are conventional in the case of the illustrated embodiment consist of an oscillating light 18 and its associated oscillation mechanism and lamp, two directional strobe lights, which are preferably halogen lamps 20 and 22, an adjustable take down light 24, and three arrays of LEDs 26, 28 and 30 which may be driven to provide flashing lights of different color. Other complements and types of light sources may be employed. Finally, a linear strobe lamp array 32 completes the compliment of warning functions. All of these lamps are mounted on a mounting strip 50, attached to the extrusion 33 which provides the housing of light bar 16, thus, the mounting structure is provided by the L-shaped plastic extrusion 33. This extrusion 33 has a back or rear wall 52 and a bottom wall or base 53. It may have several grooves 54 which enhance the appearance of the light bar 16 cosmetically as well as enhance the flexibility of the extrusion 33.

The light bar 16 extends laterally across the windshield 14, and the extrusion 33 and end caps 38 and 40 provide an optically screened enclosure which prevents the escape of the light from the powerful, intense sources 18–32 of the light bar 16. A cooling fan 54 may be installed within the enclosure.

Figure 8:
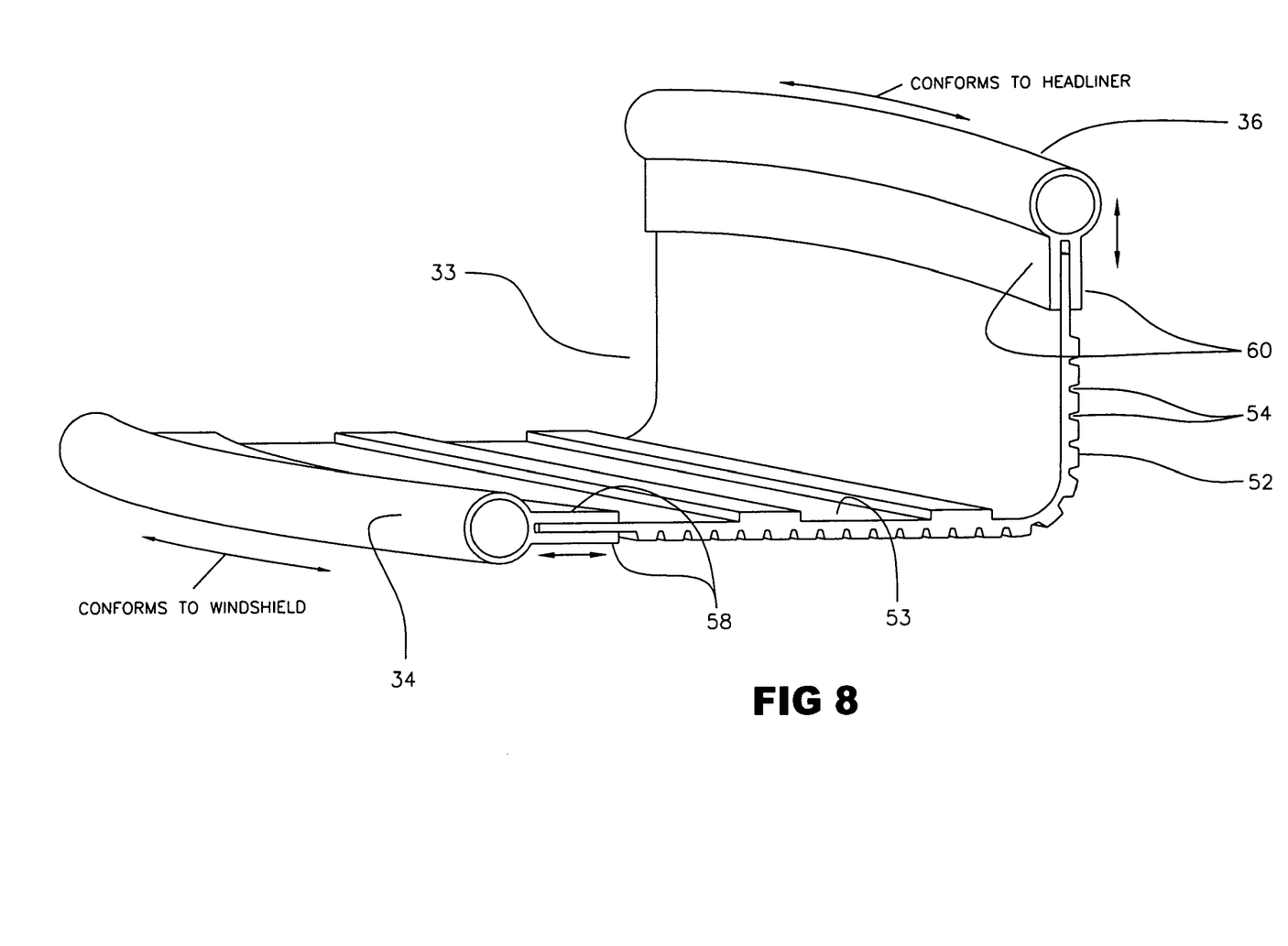
FIG. 8 is a perspective view of the adjustable mounting structure including an L-shaped support member, which may be an extrusion of plastic material and somewhat flexible, particularly at the junction of the face and wall of the extrusion, and the view showing the adjustable rubber boots or gaskets, which conform the light bar to the ceiling or headliner and to the windshield, and enables mounting of the light bar in the proximity of the inside of the windshield.

As best in shown in FIG. 8 the gaskets or boots which conform the enclosure to the windshield 14 and ceiling 15 (headliner) of the vehicle 10 are adjustably mounted by having sleeves 58 and 60 which fit over the outside edges of the base 53 and rear wall 52 of the extrusion 33.

The brackets 42 and 44 each have two parts (see FIGS. 1A and 7) which are pivotally connected to each other. The upper part 45 has a flange 47 which connects to the ceiling 15 or headliner, while the lower part 47 is attached to the strip 50. The tension in the connection (bolts and nuts) 41 of the parts 45 and 47 may be increased to prevent swinging after installation.

Figure 4:
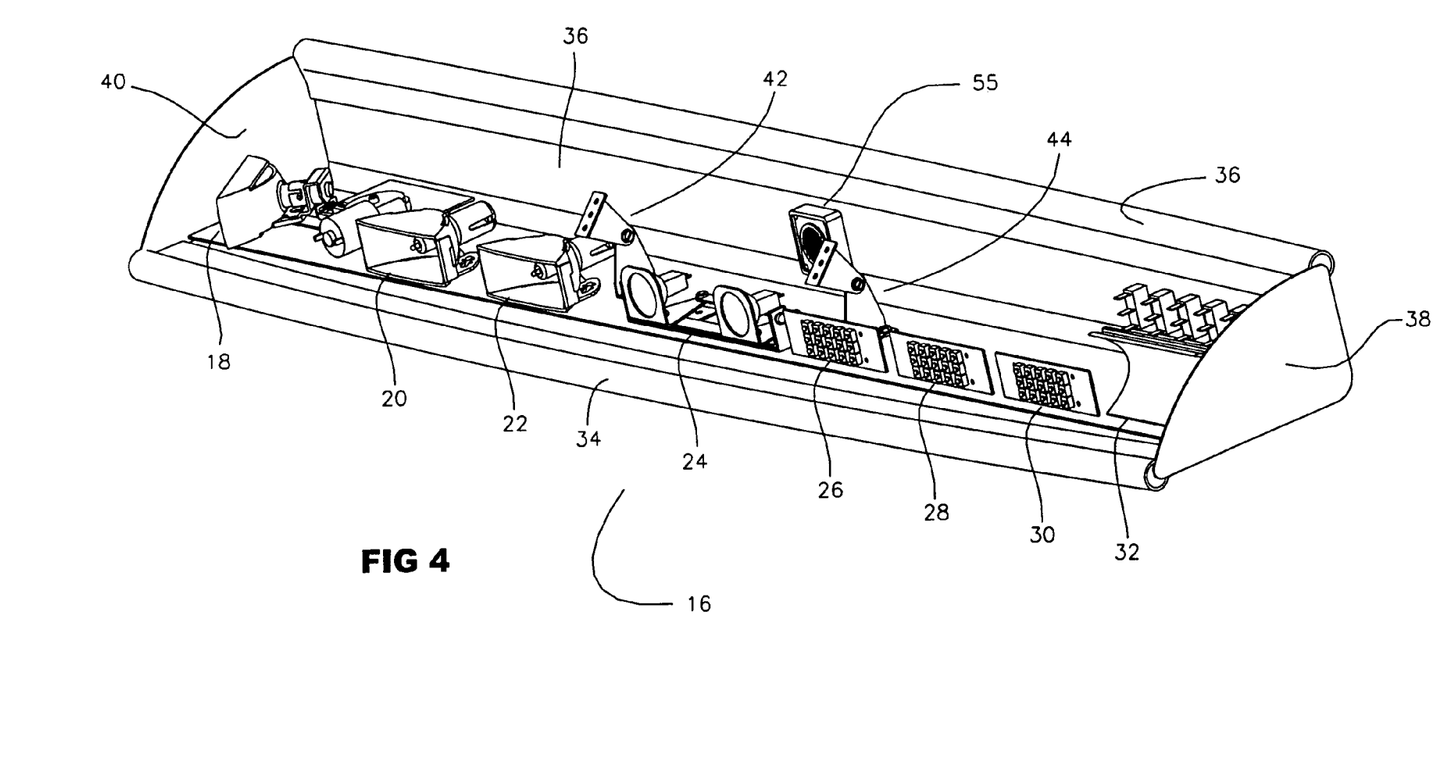
FIG. 4 is a more artistic perspective view of the light bar shown in FIG. 3.
Figure 4A:
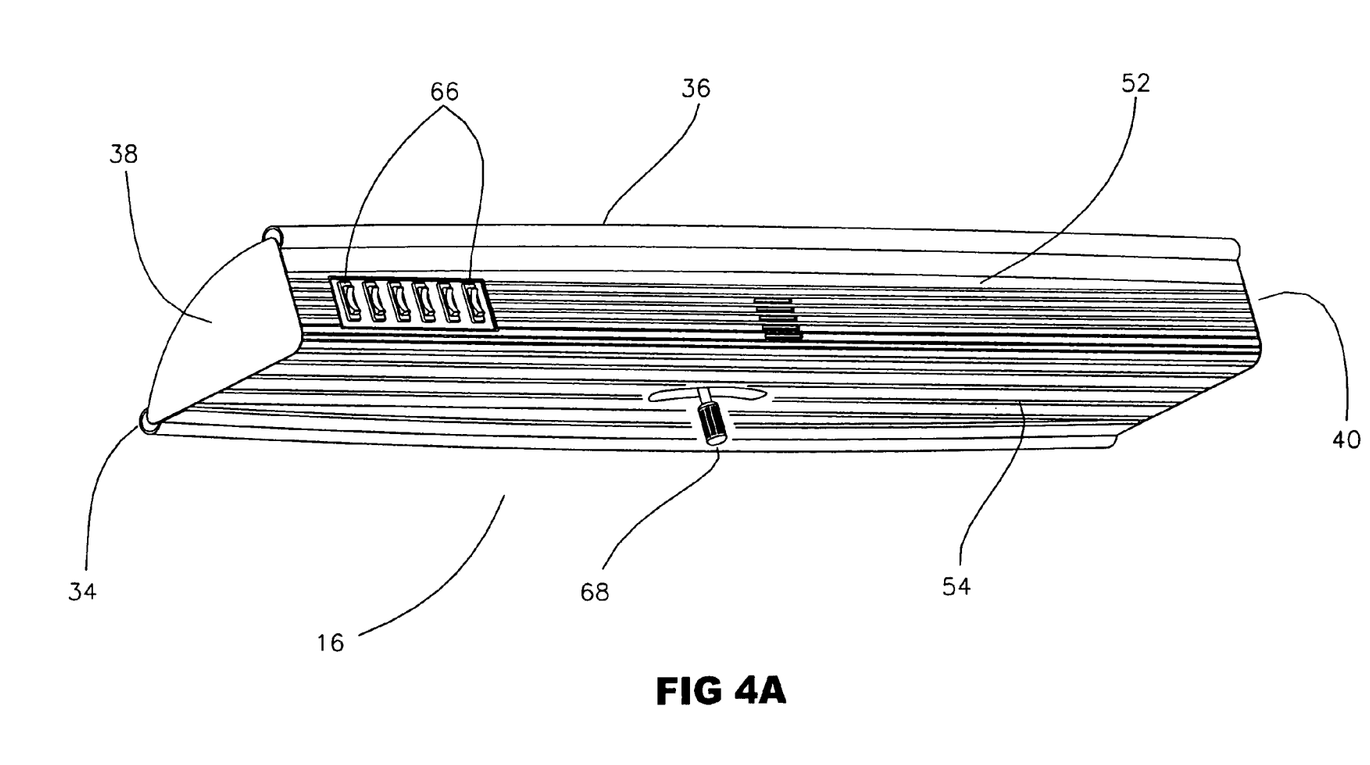
FIG. 4A is a perspective view, taken from the rear, of the light bar shown in FIGS. 3 and 4.
Figure 5:
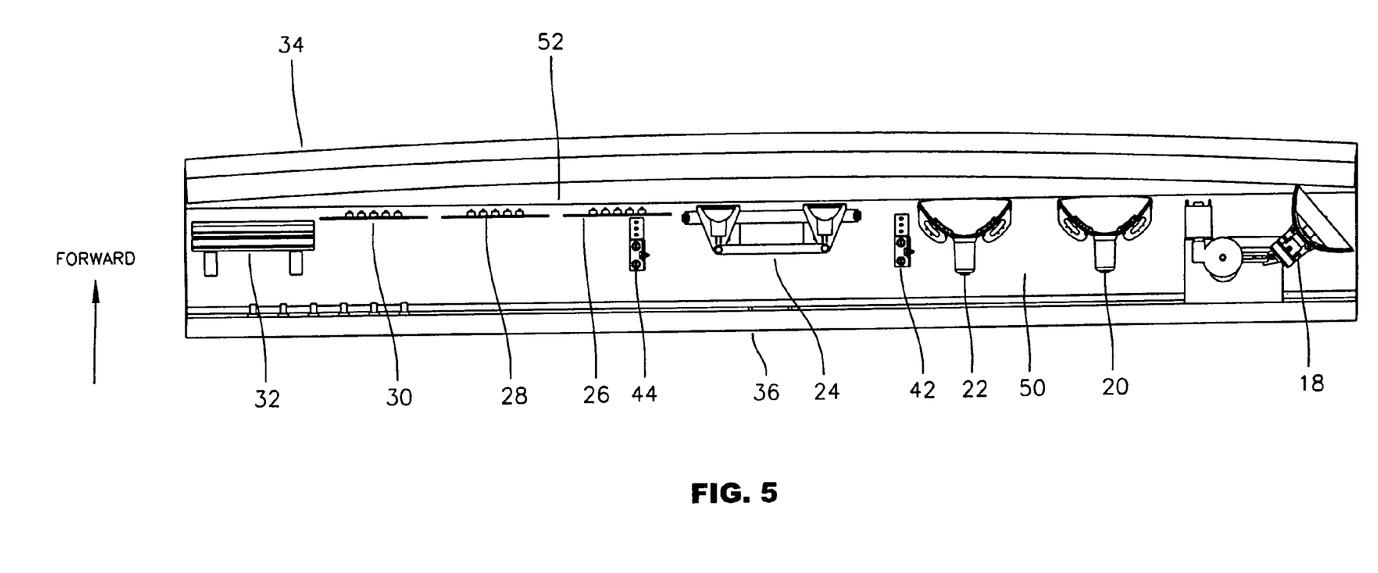
FIG. 5 is a top view of the light bar of FIG. 3.
Figure 6:
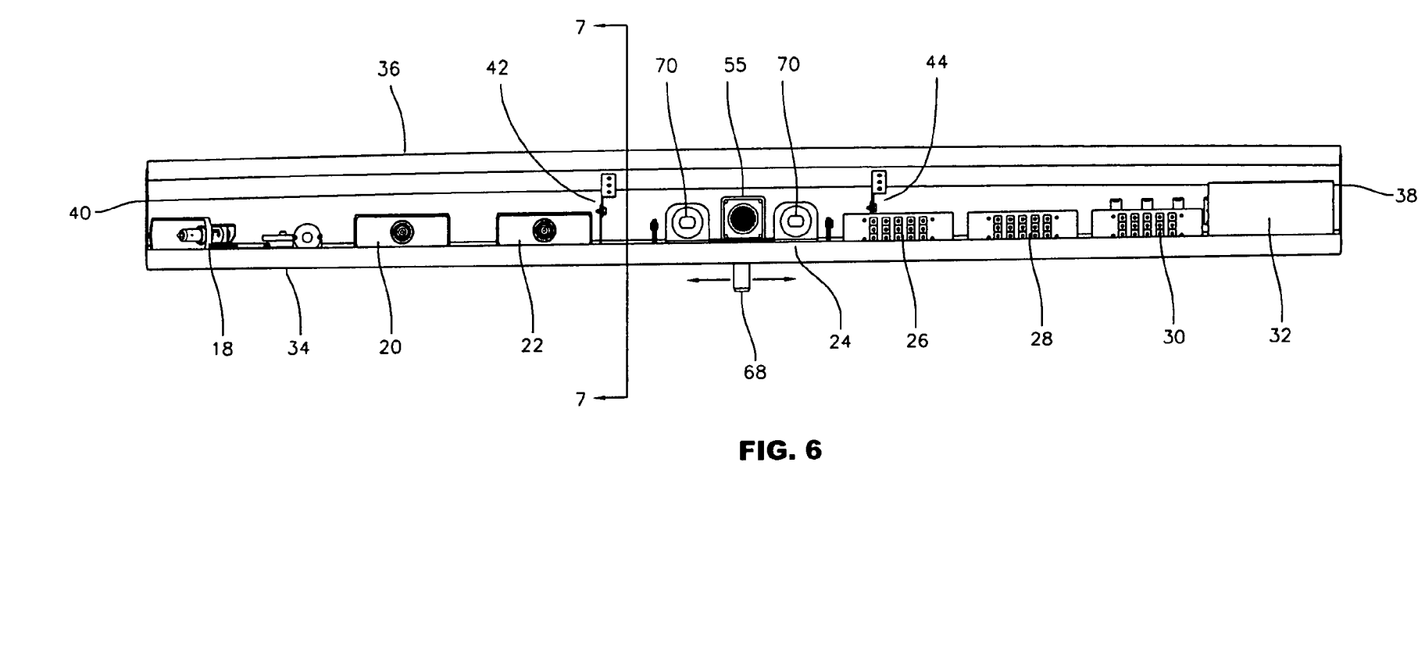
FIG. 6 is a front view of the light bar.
Figure 7:
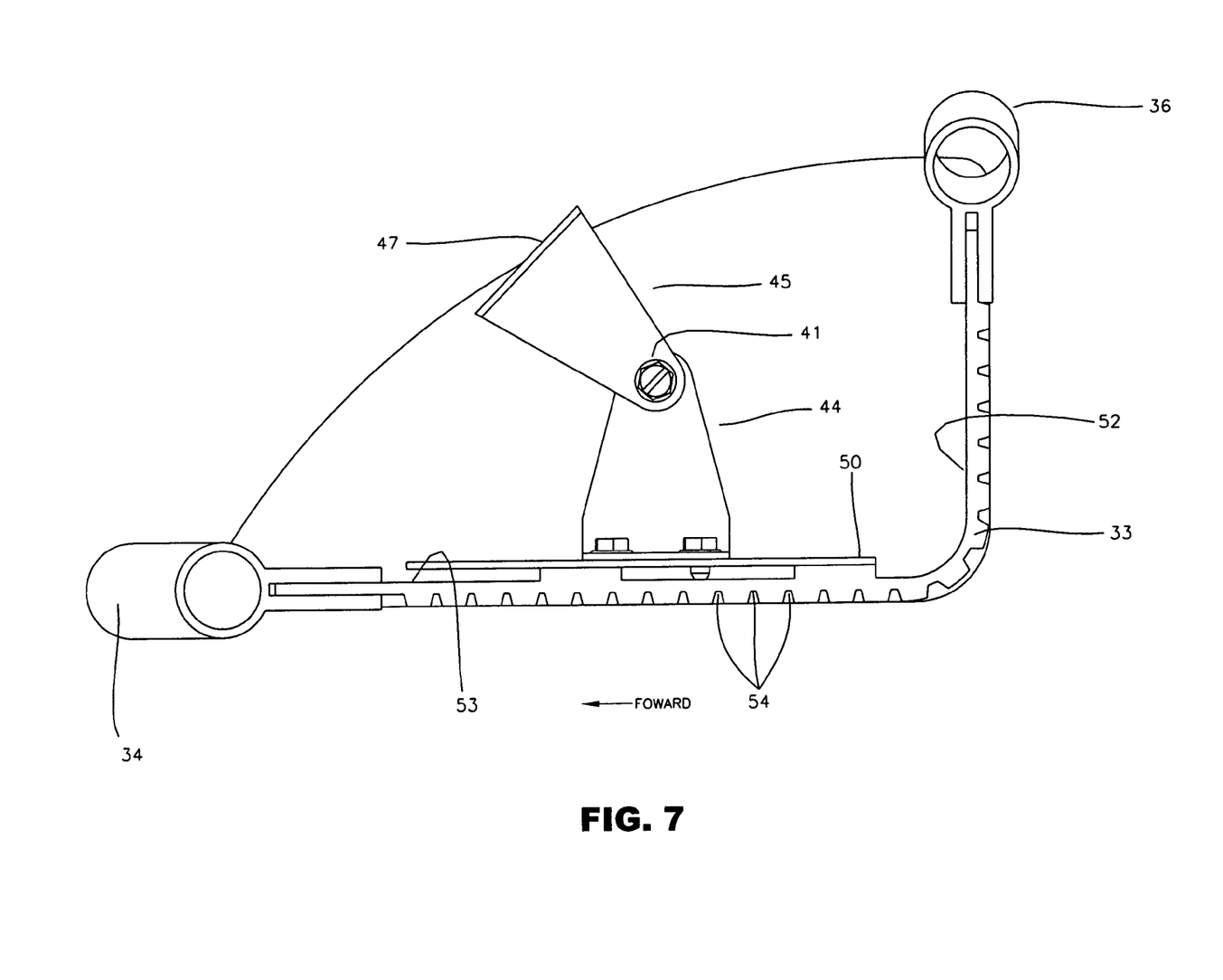
FIG. 7 is a sectional view taken along the line 7—7 in FIG. 6.

The side of the light bar 16 facing the driver presents the grooved, backside of the extrusion 33 (see FIGS. 4A, 9 and 9A). Also mounted in the extrusion 33 and extending therethrough is a plurality of electrical switches 66. Power is brought to the light bar 16 via a cable not shown. This cable may, for example, plug into the 12-volt cigarette lighter or accessory receptacle below the dashboard. The switches direct the power to the various light sources 18–32 and they select different ones of these sources as required by the operator. Also visible from the backside of the light bar 16 is a knob 68 which controls the positioning of the spotlights 70 of the take down light 24. This knob 68 provides the take down light 24 adjusting handle.

Figure 12:
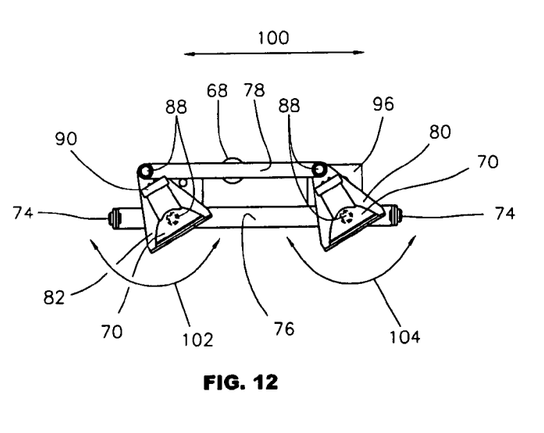
FIG. 12 is a top view of the take down light of FIGS. 10 and 11.
Figure 15A:
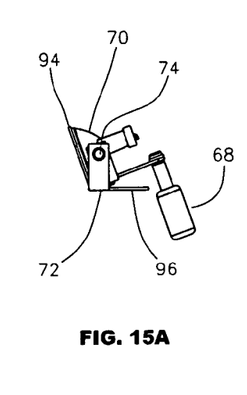
FIGS. 15A, 15B and 15C show the take down light with its spotlight lamps adjusted to tilt the beam emitted from the lamps in different directions.
Figure 15B:
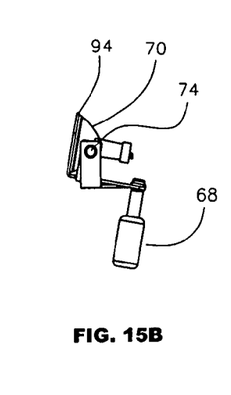
Figure 15C:
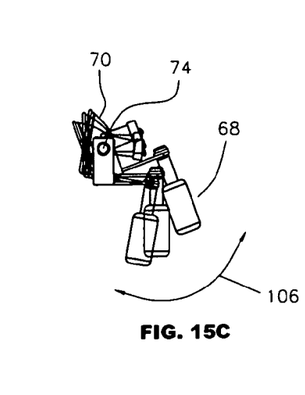

The take down light 24 has a U-shaped base 72 which mounts on the strip 50. This base 72 is connected at pivot 74 to a U-shaped leg 76. This leg 76, another leg 78, and arms 80 and 82 provide a pantograph mechanism, in as much as the legs 76 and 78 and arms 80 and 82 are connected to each other by four bearings providing pivots 88. The knob 68 is connected to the rear leg 78. The spotlights are inserted in sockets 90 extending from reflectors 92 on flanges 94 which extend upwardly from the arms 80 and 82. The base may have fingers 96 which provide an extension of the platform afforded by the U-shaped bracket 72. FIG. 12 has three sets of arrows 100, 102 and 104 showing how the handle may be moved laterally so as to accomplish swinging about a vertical axis along arches indicated by the arrows 102 and 104. Moving the knob 68 upwardly and downwardly provides tilting of the spotlights and therefore movement of the beam about the horizontal pivotal axis defined by the pivot 74. This upward and downward tilt is about an arc indicated by the arrow 106 in FIG. 15C.

From the foregoing description it will be apparent that there has been provided an improved light bar which is of a design to enable mounting of the bar internally of a vehicle and particularly against its windshield and in proximity thereto. The optical performance of the light bar is enhanced and mounting it internally does not interfere with the operation of the vehicle because escape of light into the interior of the vehicle is limited. Variations and modifications in the herein described light bar, within in the scope of the invention, will undoubtedly suggest themselves to those skilled in the art. Accordingly, the foregoing description should be taken as illustrative and not in a limiting sense.

The invention claimed is:

1. A light bar installable internally of a vehicle having an interior with a windshield contained within a frame having a portion above said windshield, said light bar comprising a housing containing at least one light source, a mounting member attached to said portion and having at least one movable part enabling displacement of said housing with respect to said windshield thereby supporting said light bar with said source facing said windshield and so as to conform to the shape of said windshield;

a plurality of said mounting members spaced from each other in a lateral direction across said windshield, and said members adjustably extending from said portion to enable engagement of said housing with said windshield, with said light source in proximity to said windshield, wherein said housing has a base and a wall, said wall having an upper edge from which said mounting members extend into engagement with said portion, and said base having an outside edge which extends in said lateral direction and from which a gasket adjustable toward and away from said windshield, extends into engagement with said windshield, wherein said gasket is adjustably mounted along said edge of said wall and said base for yieldably engaging a ceiling of said vehicle providing said portion and windshield respectively thereby accommodating different curvatures thereof.

2. A take down light comprising a spot light lamp inside a vehicle having a windshield, said spot light lamp is mounted on a platform for lateral and tiltable movement to direct a light beam from said spot light lamp in a plurality of directions through said windshield thereby providing a take down function, wherein said platform is one arm of a pair of arms of a pantograph which also has a pair of legs pivotally connected to said arms, a bracket on which one of said legs is pivotally mounted on an axis extending along said legs, and a manually movable knob attached to one of said legs for shifting said pantograph laterally and titling said pantograph about said axis thereby directing said beam sidewise, upwardly and downwardly in accordance with the selected movement of said knob.

* * * * *